United States Patent
Takatsuji et al.

(10) Patent No.: US 7,056,191 B2
(45) Date of Patent: Jun. 6, 2006

(54) METHOD FOR CHAMFERING A PLATE-LIKE MEMBER

(75) Inventors: Hideo Takatsuji, Aichi (JP); Akihiko Aritomi, Kanagawa (JP); Masao Goto, Aichi (JP); Keiji Fujikawa, Aichi (JP); Tatsuya Yamasaki, Aichi (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/874,346

(22) Filed: Jun. 24, 2004

(65) Prior Publication Data
US 2005/0032460 A1 Feb. 10, 2005

(30) Foreign Application Priority Data
Jun. 26, 2003 (JP) ............................. 2003-182260
May 27, 2004 (JP) ............................. 2004-157807

(51) Int. Cl.
*B24B 1/00* (2006.01)
*B24B 7/19* (2006.01)
*B24B 7/30* (2006.01)

(52) U.S. Cl. .............................. 451/28; 451/42; 451/44
(58) Field of Classification Search ................ 451/5, 451/41, 44, 43, 11
See application file for complete search history.

(56) References Cited

U.S. PATENT DOCUMENTS 3,474,944 A * 10/1969 Chatelain et al. ............. 225/2
4,161,819 A * 7/1979 Pietrantonio ............. 30/164.95
4,993,896 A * 2/1991 Dombrowski et al. ...... 409/138
5,201,617 A * 4/1993 Delaval et al. ............. 409/131
5,299,389 A * 4/1994 Yonaha et al. .................. 451/5
6,247,999 B1 * 6/2001 Tokiwa ........................... 451/8
6,623,339 B1 * 9/2003 Igarashi et al. ............... 451/42
6,664,503 B1 * 12/2003 Hsieh et al. ............ 219/121.72

FOREIGN PATENT DOCUMENTS

| DE | 33 12 898 | | 10/1984 |
| FR | 2 545 025 | | 11/1984 |
| FR | 2620242 | A1 * | 3/1989 |
| JP | 10-296600 | | 11/1998 |
| JP | 2002-120134 | | 4/2002 |

OTHER PUBLICATIONS

PCT Pub. No. WO 01/10588 A1 Feb. 15, 2001 □□Igarashi, Takashi.*
Patent abstract of Japan, JP2002-120134, Apr. 23, 2002.*
PCT Pub. No. WO 01/10588 A1 Feb. 15, 2001 Igarashi, Takashi et al.*
Patent Abstract of Japan, JP 2002-120134, Apr. 23, 2002.*

* cited by examiner

*Primary Examiner*—Joseph J. Hail, III
*Assistant Examiner*—Bryan Muller
(74) *Attorney, Agent, or Firm*—Oblon, Spivak, McClelland, Maier & Neustadt, P.C.

(57) ABSTRACT

The moving trajectory that a robot hand 16 depicts when chamfering a glass sheet G is a trajectory A that a center of rotation $0_1$ of the robot hand 16 vertically moves along a straight line Q connecting between the center of rotation $0_1$ of the robot hand 16 and a rotation $0_2$ of a grinding wheel 30.

3 Claims, 15 Drawing Sheets

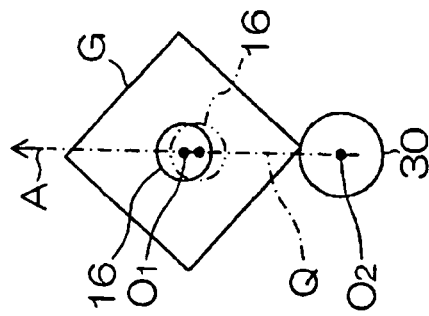
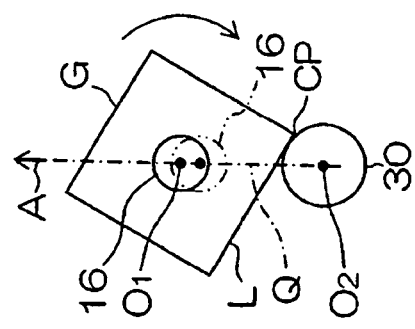
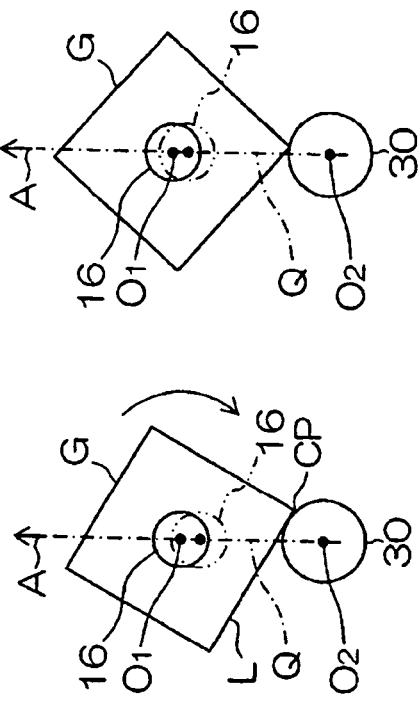
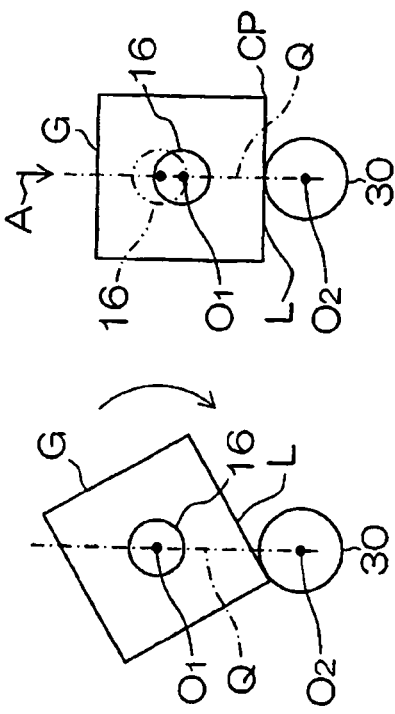
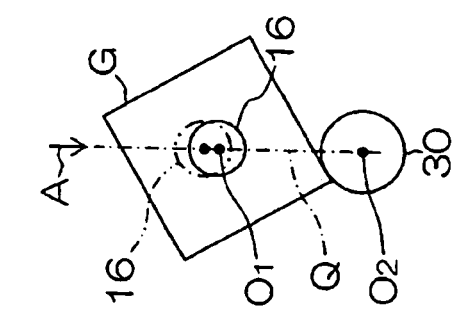
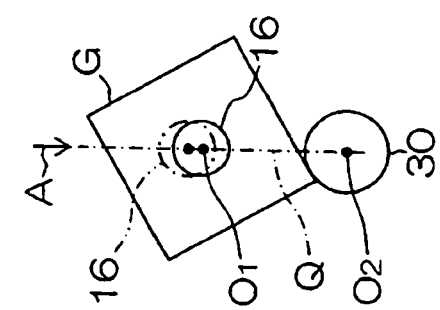
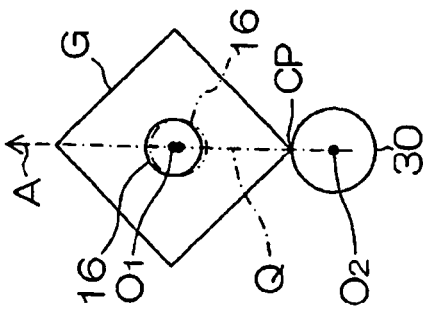

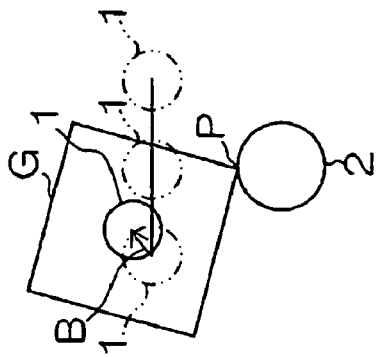
Fig. 13 (a)   Fig. 13 (b)   Fig. 13 (c)   Fig. 13 (d)
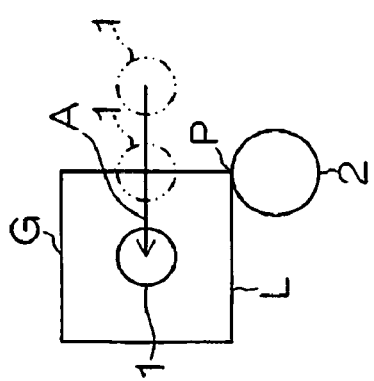
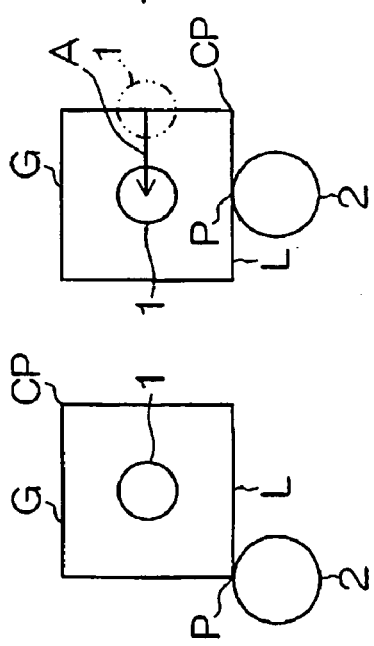
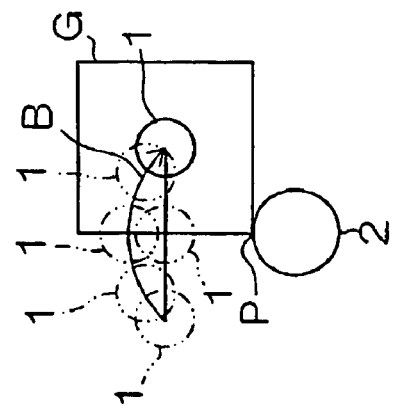
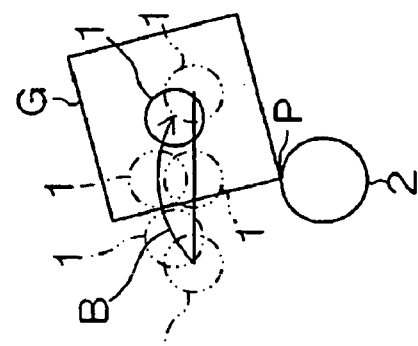
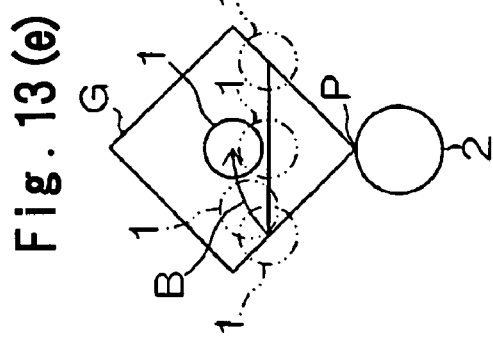
Fig. 13 (e)   Fig. 13 (f)   Fig. 13 (g)

Fig. 15(a)
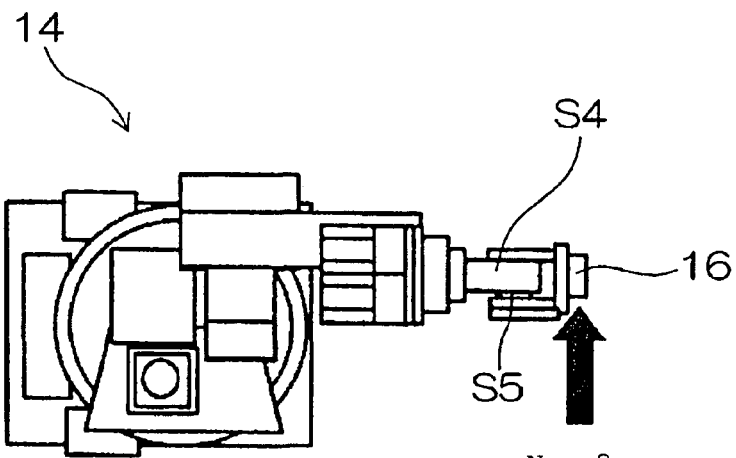
Fig. 15(b)
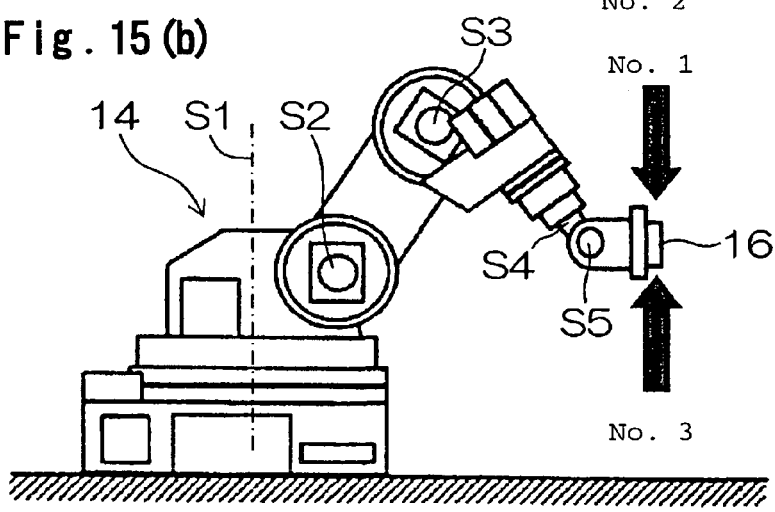
Fig. 16
|  | Direction No. 1 | Direction No. 2 | Direction No. 3 |
|---|---|---|---|
| Backlash | 0.05 mm | 0.25 mm | 0.05 mm |
| 490 N flexure | 0.8 mm | 0.8 mm (372.4 N) | 0.8 mm (401.8 N) |

Fig. 17(a)
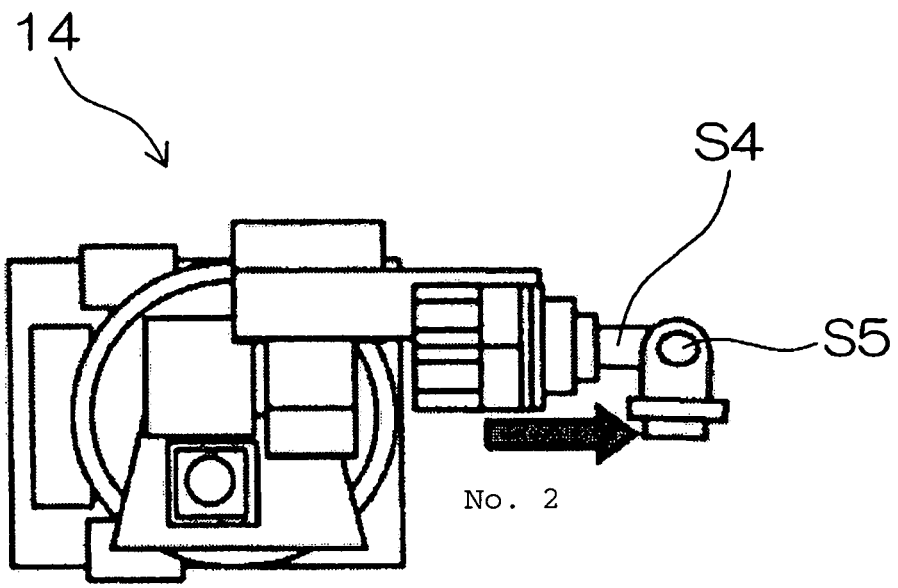
Fig. 17(b)
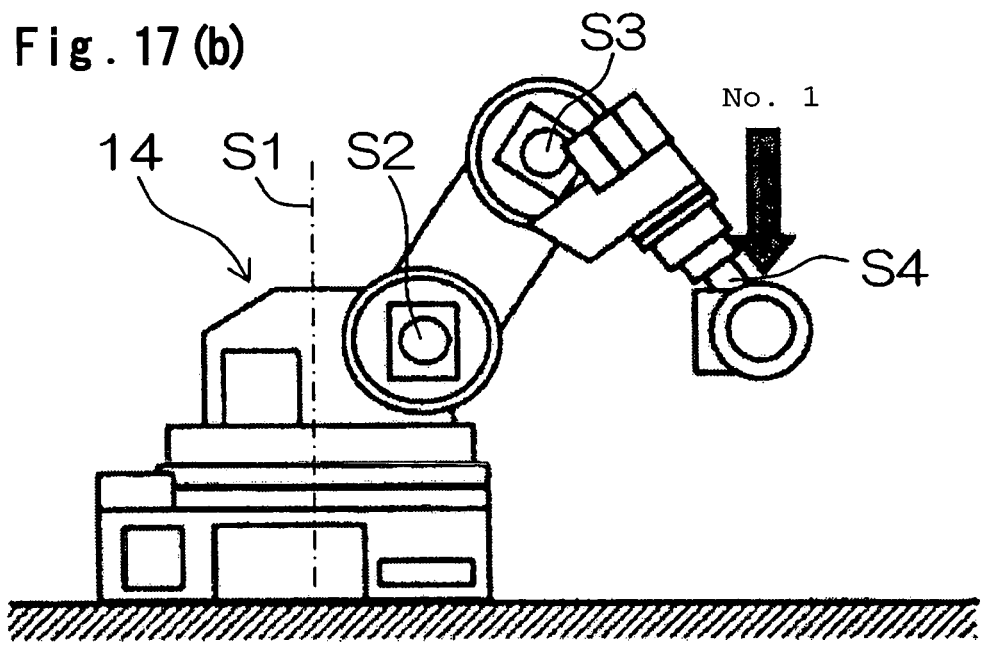
Fig. 18
|  | Direction No. 1 | Direction No. 2 |
|---|---|---|
| Backlash | 0.07 mm | 0.04 mm |
| 490 N flexure | 0.52 mm | 0.54 mm |

METHOD FOR CHAMFERING A PLATE-LIKE MEMBER

The present invention relates to a method for chamfering a plate-like member, in particular a method for chamfering an edge portion of a glass sheet.

A chamfering machine for a glass sheet is one which uses a robot hand to hold a glass sheet to be chamfered and chamfers the entire edge portion of the glass sheet by moving and rotating the robot hand while pressing an edge portion of the glass sheet against a grinding wheel (for example, JP-A-10-296600).

As another chamfering machine for a glass sheet, there has been proposed one which facilitates supply of a coolant by changing a contact point of a grinding wheel with a glass sheet from the uppermost position to a lower position than the uppermost position when chamfering the glass sheet (see JP-A-2002-120134, page 5 and FIG. 11).

In each of the chamfering machines, a glass sheet has a linear edge portion or a corner portion brought in contact with the uppermost position of the grinding wheel to be chamfered. In the chamfering machine disclosed in the second prior art document, the contacting point is moved only when chamfering a recessed portion of a glass sheet. Chamfering a linear edge portion or a corner portion of a glass sheet is performed by pressing an edge portion of the glass sheet against one point P of a grinding wheel 2 held by a robot hand 1 as shown in FIGS. 13(a) to (g). When a glass sheet G has a linear portion (side portion) L chamfered, the moving trajectory depicted by a robot hand 1 is a straight line parallel with the linear portion L as shown by arrows A in FIGS. 13(a) to (c). When the glass sheet G has a corner portion CP chamfered, the moving trajectory is a large circular arc as shown by arrows B in FIGS. 13(d) to (g). This is because the robot hand is moved to rotate the glass sheet G so as to perform chamfering at the uppermost position of the grinding wheel. By repeating this movement for four sides of the glass sheet G, the entire edge portion of the glass sheet as a single sheet is chamfered by the grinding wheel 2.

However, the conventional chamfering machines for a glass sheet G have caused a problem of low productivity since the moving amount of the robot hands that needs to chamfer a single glass sheet G is large.

Although the moving trajectory of the robot hands has a circular arc shape when chamfering a corner portion of a glass sheet G, the chamfered corner portion has an angular shape as shown in FIG. 11 since the moving trajectory actually comprises polygonal lines, which are formed by dividing a circular arc at plural points and connecting the respective points. Accordingly, the conventional chamfering machines for a glass sheet G have caused a disadvantage that it is difficult to perform chamfering with good precision. When an attempt is made to increase the moving speed of the robot hands for an increase in productivity, the moving trajectory becomes rougher since the number of the dividing points of the circular arc as the moving trajectory of the robot hands for chamfering a corner portion decreases. From the viewpoint of maintaining required chamfering precision, there is a limitation to an increase in the moving speed of the robot hands.

The present invention is proposed in consideration of the circumstances stated earlier. It is an object of the present invention to provide a method for chamfering a plate-like member, which is capable of increasing productivity and chamfering precision.

In order to attain the object, the present invention provides a method for chamfering a plate-like member, which comprises chamfering a peripheral edge portion of a plate-like member with a robot hand being moved and rotated while using the robot hand to hold the plate-like member and press the peripheral edge against a rotating grinding wheel of a chamfering machine, and which further comprises chamfering the peripheral edge with the robot hand-being moved and rotated so that a grinding point, at which an edge of the plate-like member and a peripheral surface of the grinding wheel contact, moves along the peripheral surface of the grinding wheel.

In a first preferred mode, the plate-like member has the peripheral edge chambered with the robot hand being moved and rotated so that the grinding point between an edge of the plate-like member and a peripheral surface of the grinding wheel contact moves along the peripheral surface of the grinding wheel. Thus, it is possible to make the moving distance of the robot hand shorter than a case wherein the grinding point is fixed as conventional. Accordingly, it is possible not only to significantly reduce the processing time required for chamfering a glass sheet in its entirety but also to increase chamfering precision.

In a second preferred mode, the plate-like member has the peripheral edge so that the center of rotation of the robot hand moves along a straight line connecting between the center of rotation of the robot hand and the center of the grinding wheel. Thus, it is possible to make the moving distance of the robot hand to the minimum. Accordingly, it is possible not only to chamfer the plate-like member so as to have the corner or corners formed in a circular arc-shape.

In a third preferred mode, the robot hand is rotatably provided on a sixth axis of a six-axis articulated robot, and the edge portion of the plate-like member is chamfered while the robot is in such a posture that an arm linked to the fifth axis of the articulated robot is horizontal and perpendicular to a plane parallel with axes of arms respectively linked to the second axis, the third axis and the fourth axis. Thus, it is possible to chamfering the plate-like member in such a state that the robot has the highest rigidity. Accordingly, it is possible not only to increase chamfering precision but also to smoothly actuate the robot without the robot being in a singular configuration.

In a fourth preferred mode, the robot for chamfering is also served as a robot for scribing and breaking off the plate-like member. Accordingly, it is possible to eliminate positioning for chamfering and to effectively perform the processes from the cutting process to the chamfering process. It is also possible to reduce the facility space.

In accordance with the present invention, the plate-like member has the peripheral edge chambered with the robot hand being moved and rotated so that the grinding point between an edge of the plate-like member and a peripheral surface of the grinding wheel contact moves along the peripheral surface of the grinding wheel. Thus, it is possible to make the moving distance of the robot hand shorter than a case wherein the grinding point is fixed as conventional. Accordingly, it is possible not only to significantly reduce the processing time required for chamfering a single glass sheet but also to increase chamfering precision.

When the plate-like member has the peripheral edge so that the center of rotation of the robot hand moves along a straight line connecting between the center of rotation of the robot hand and the center of the grinding wheel, it is possible to make the moving distance of the robot hand to the minimum. Accordingly, it is possible not only to chamfer the plate-like member so as to have the corner or corners formed in a circular arc-shape.

When the robot for chamfering is also served as a robot for scribing and breaking off the plate-like member, it is possible to eliminate positioning for chamfering and to effectively perform the processes from the cutting process to the chamfering process. It is also possible to reduce the facility space.

Figure 7:
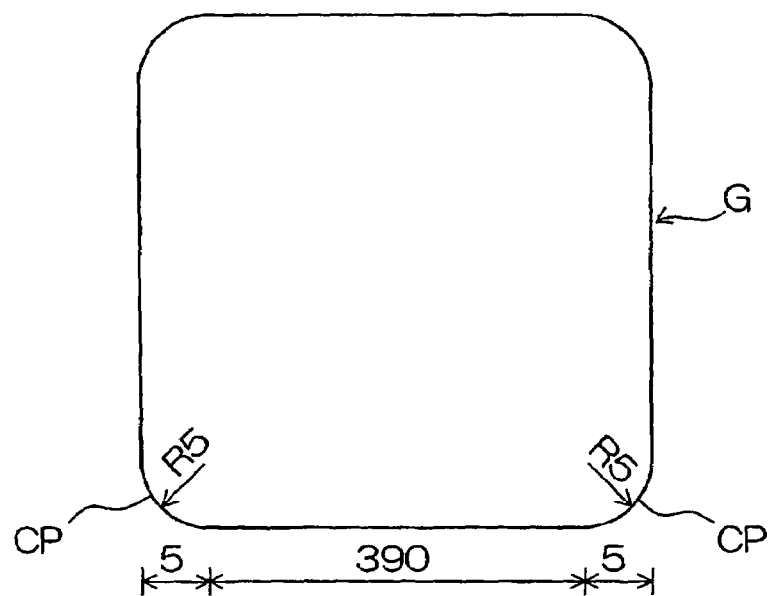
Figure 8:
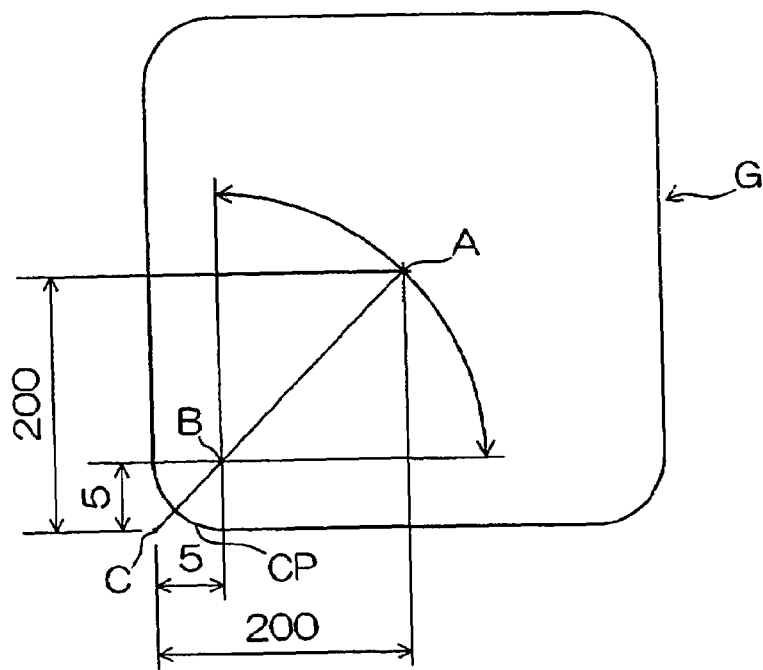
Figure 9:
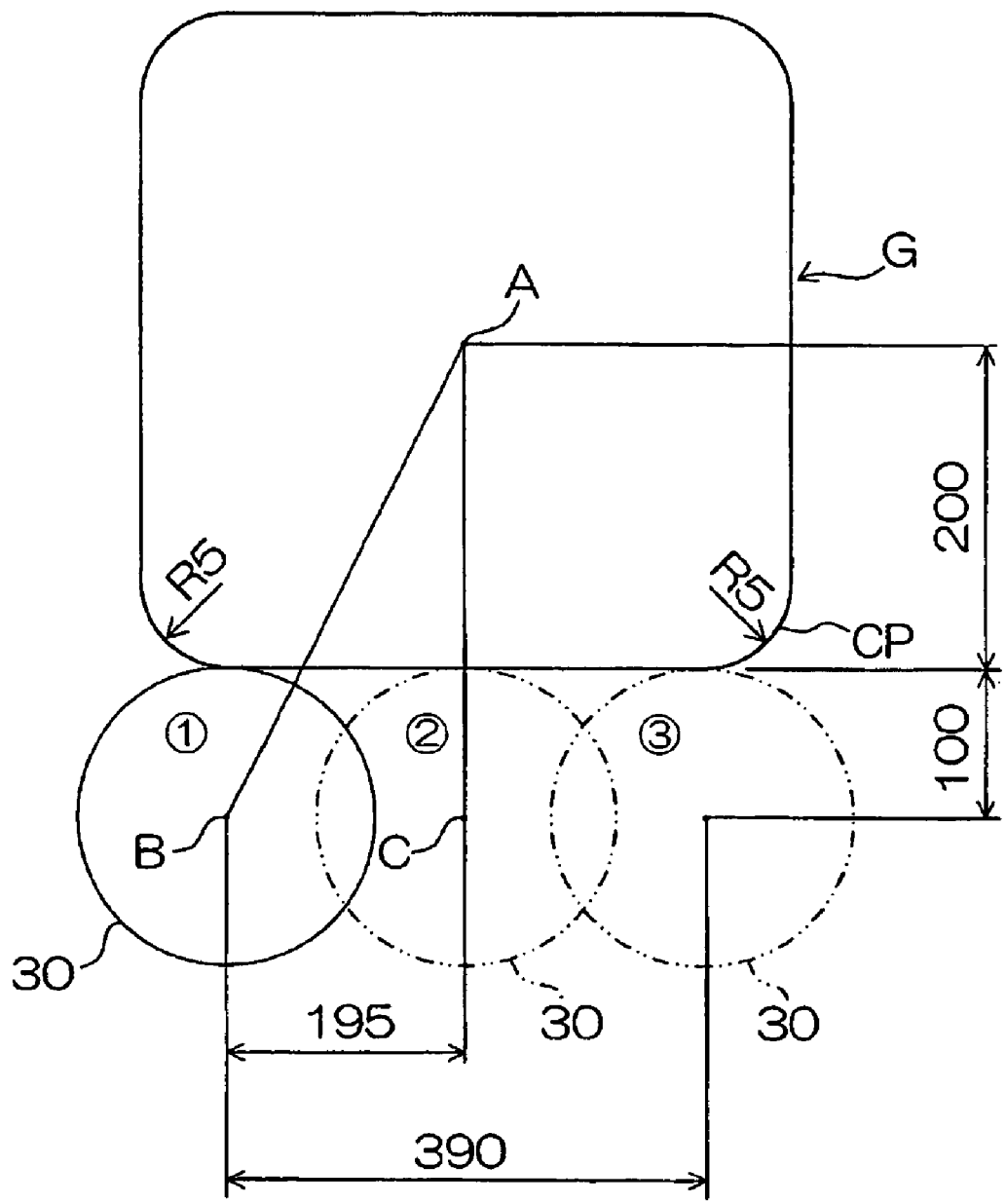
Figure 10:
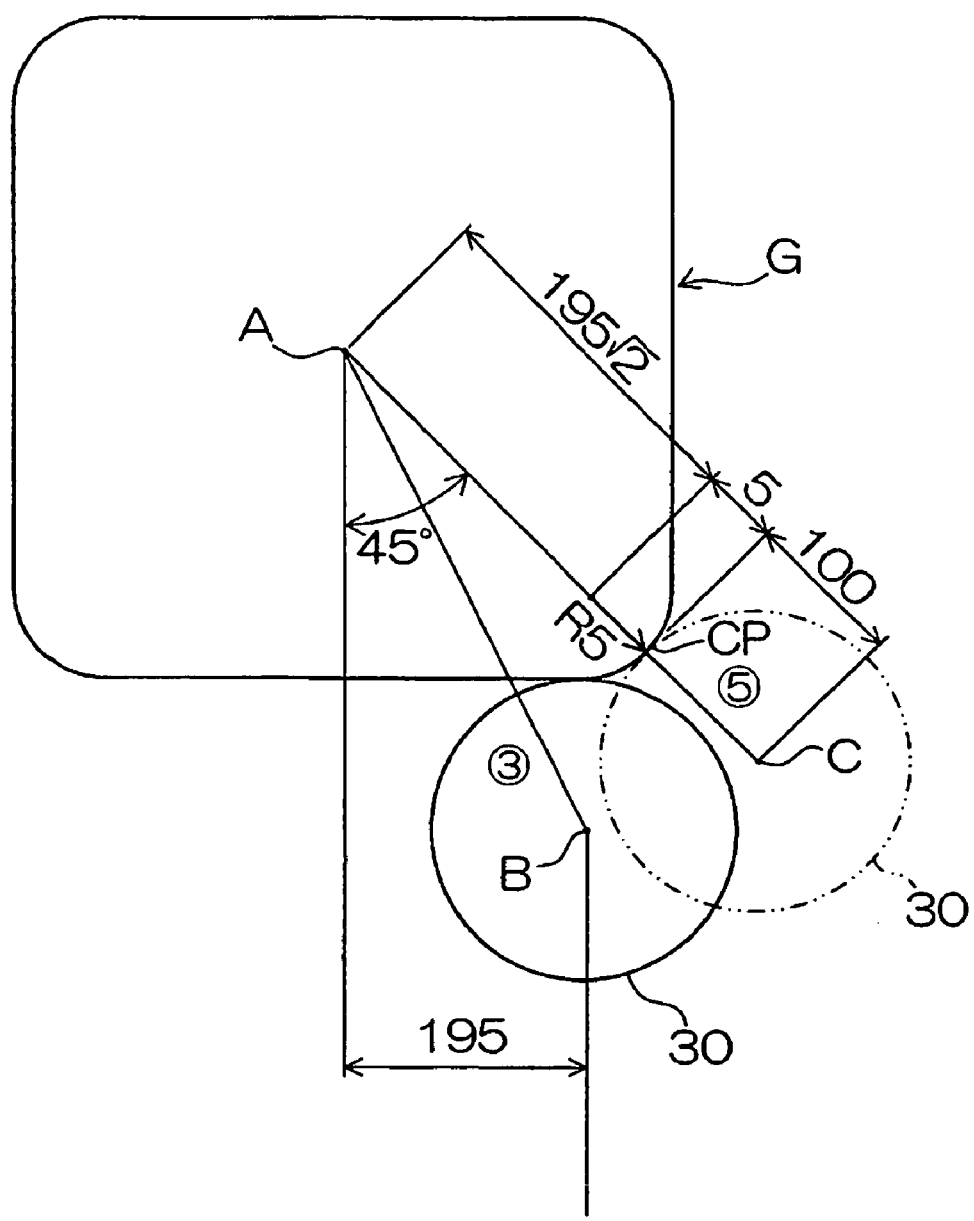
Figure 11:
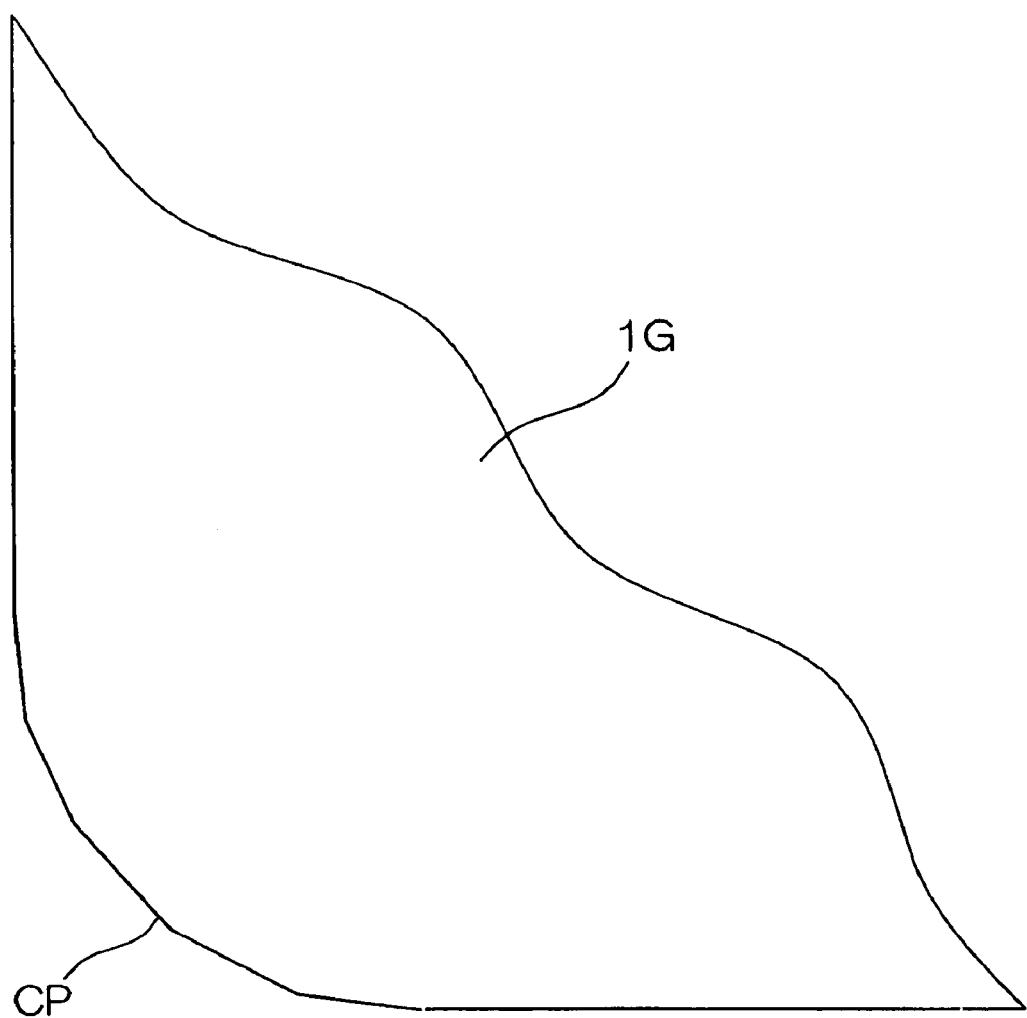
Figure 12:
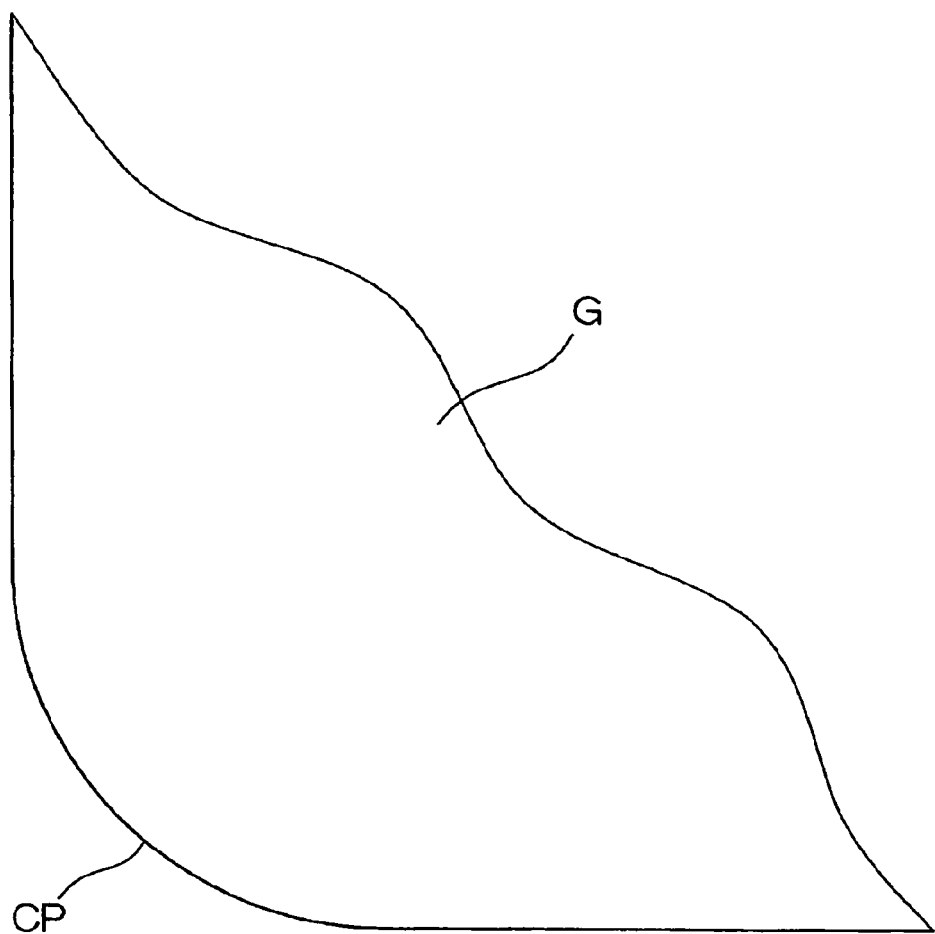
Figure 14:
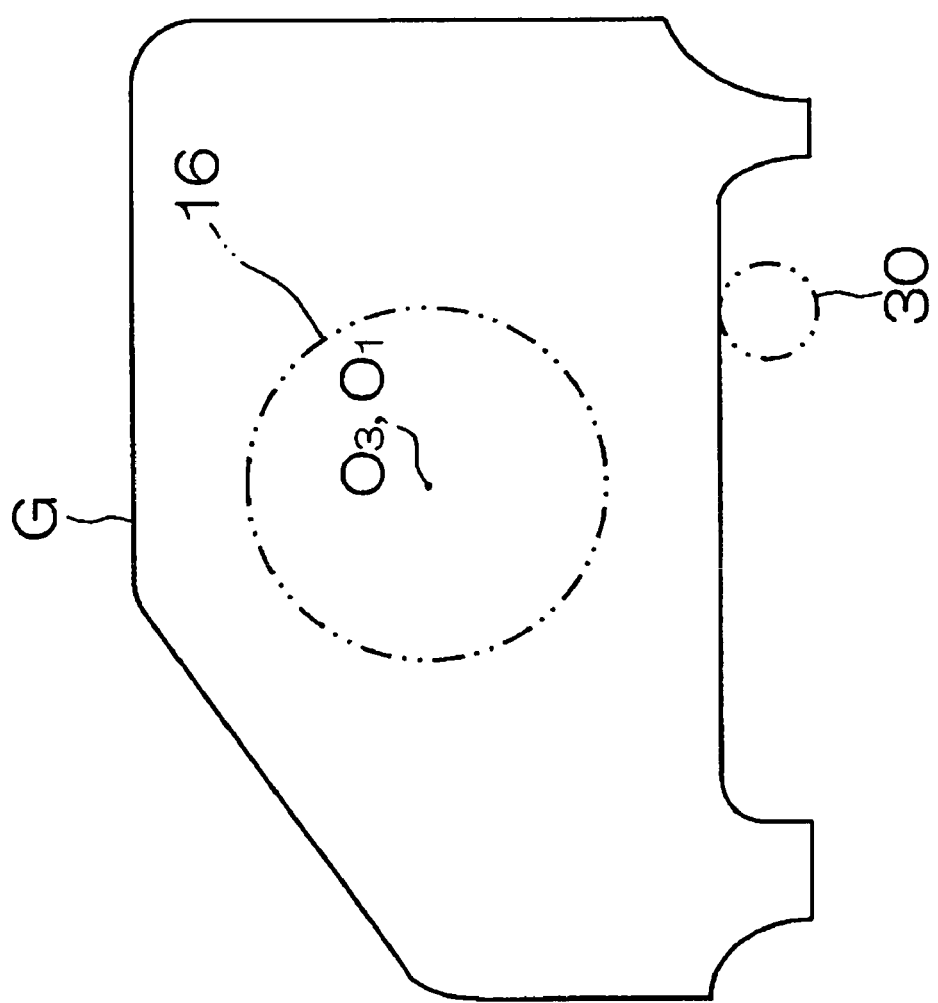

FIGS. 6(a) to 6(g) are schematic views showing the moving trajectory of the robot hand according to an embodiment;

FIG. 7 is a schematic view explaining for quantitative finding of a moving amount of a conventional robot hand;

FIG. 8 is a schematic view explaining for quantitative finding of the displacement amount of the conventional robot hand;

FIG. 9 a schematic view explaining for quantitative finding of a moving amount of the robot hand according to the embodiment;

FIG. 10 is a schematic view explaining for quantitative finding of the displacement amount of the robot hand according to the embodiment;

FIG. 11 is a schematic view showing the chamfered shape of a corner portion by a conventional machine;

FIG. 12 is a schematic view showing the chamfered shape of a corner portion by the machine according to the embodiment;

FIGS. 13(a) to 13(g) are schematic views showing the moving trajectory of the conventional robot hand;

FIG. 14 is a schematic view explaining the optimum position sucked and held by a robot hand when chamfering the peripheral edge portion of an automobile side windshield;

FIGS. 15(a) and (b) are schematic views showing the posture of flange level 0° by a six-axis articulated robot, wherein FIG. 15(a) is a top plan view, and FIG. 15(b) is a side view;

FIG. 16 is a table showing the measurements about backlash and flexure of the robot shown in FIG. 15;

FIGS. 17(a) and (b) are schematic views showing the posture of flange level 90° of the six-axis articulated robot, wherein FIG. 17(a) is a top plan view, and FIG. 17(b) is a side view; and FIG. 18 is a table showing the measurements about backlash and flexure of the robot shown in FIGS. 17(a) and (b).

Now, preferred embodiments of the method for chamfering a plate-like member according to the present invention will be described, referring to the accompanying drawings.

Figure 1:
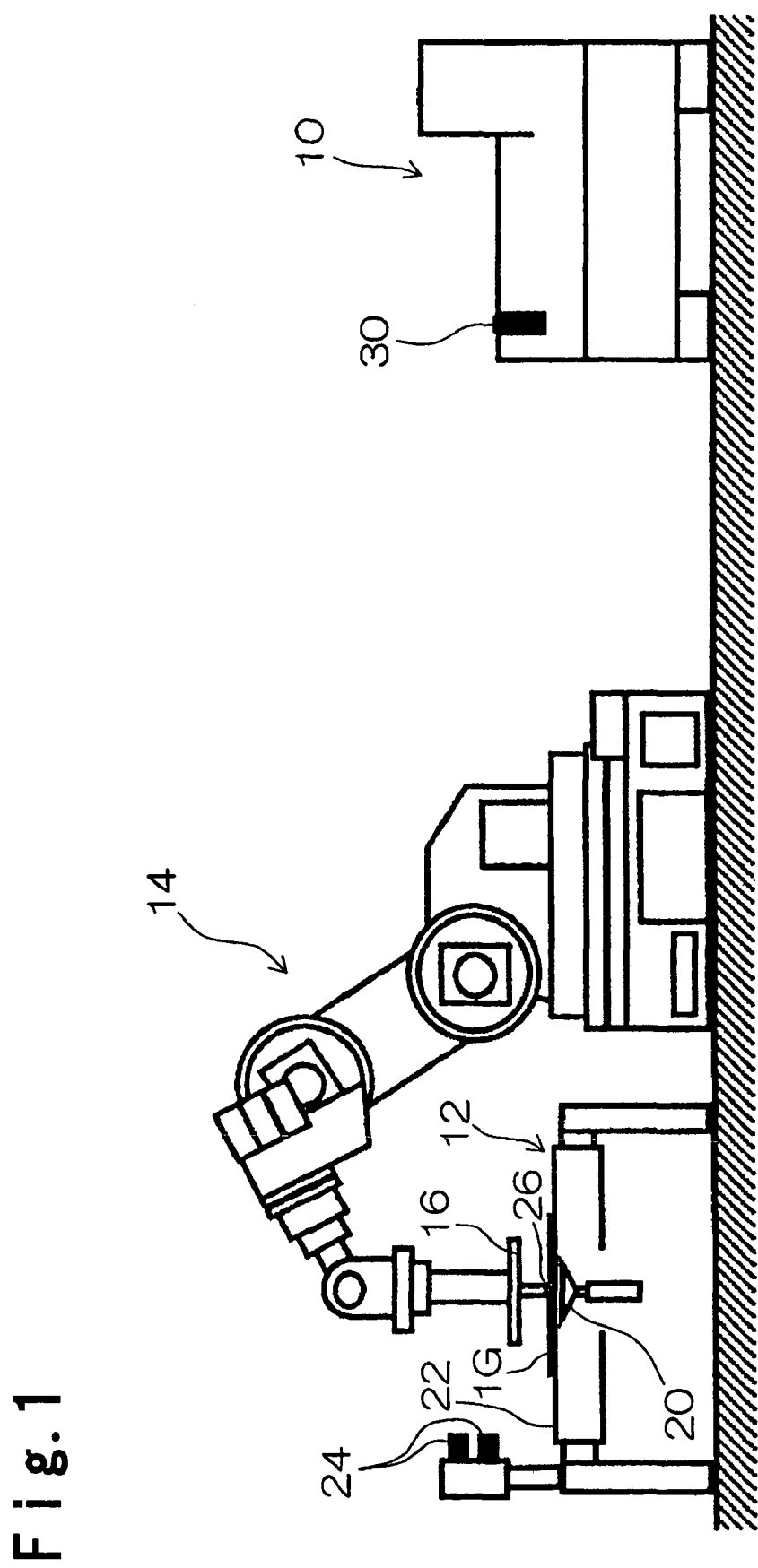
FIG. 1 is a front view showing a status wherein a glass sheet is scored by a robot in machining equipment for a glass sheet.
Figure 2:
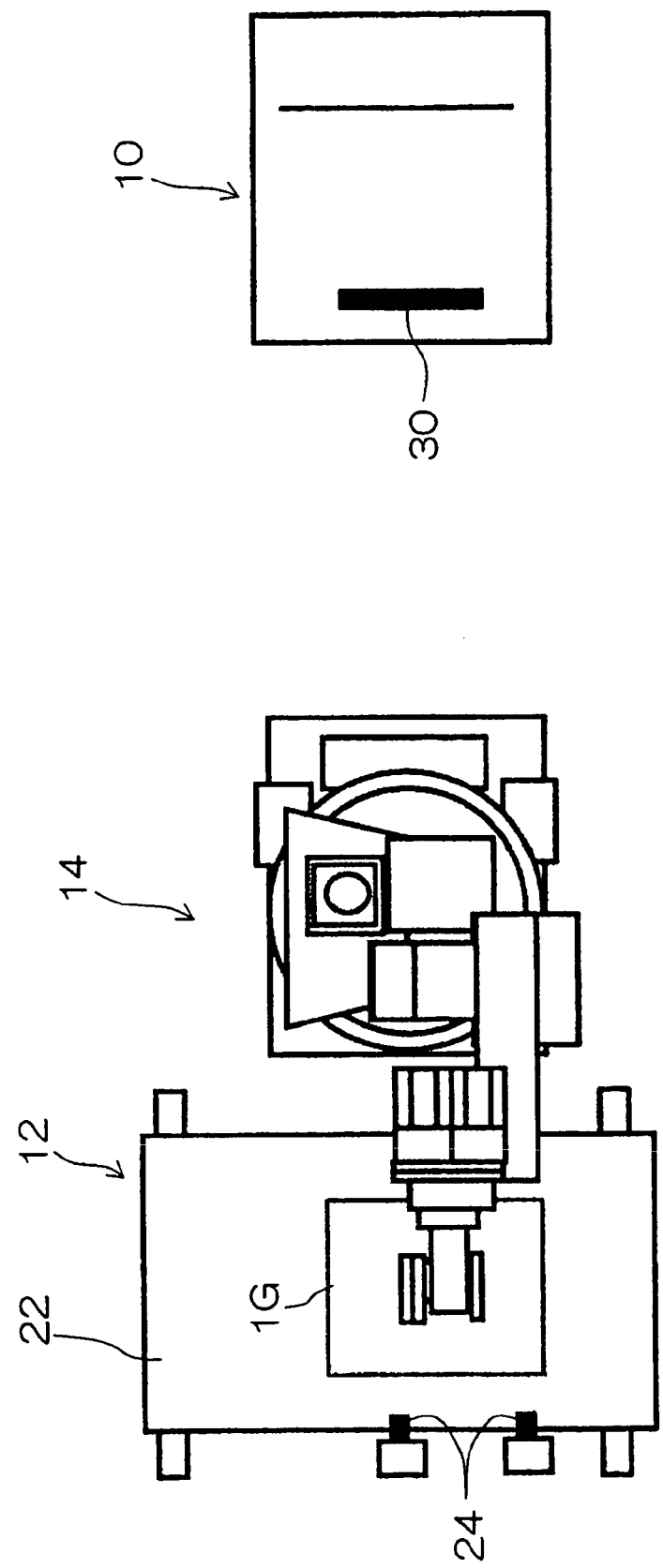
FIG. 2 is a top plan view of the status shown in FIG. 1.
Figure 3:
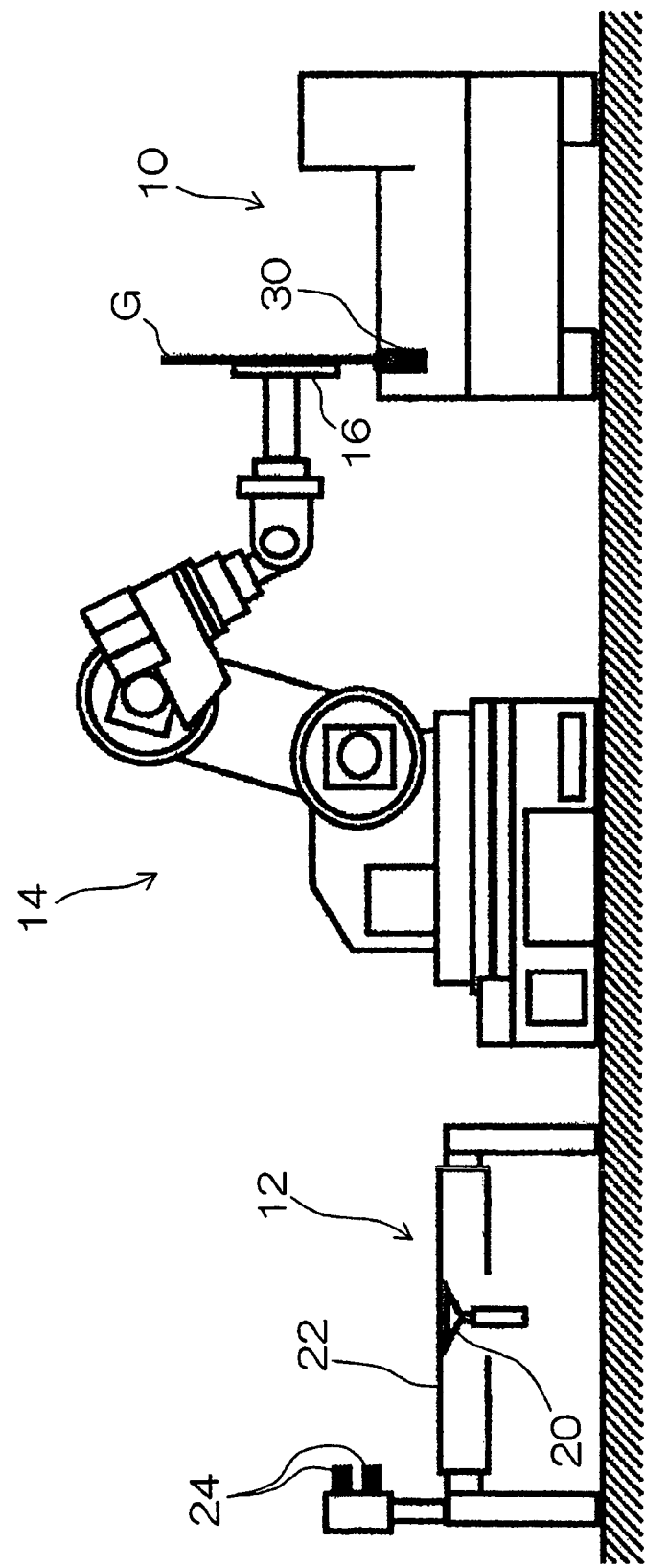
FIG. 3 is a front view showing a status wherein the glass sheet is chamfered in the machining equipment.
Figure 4:
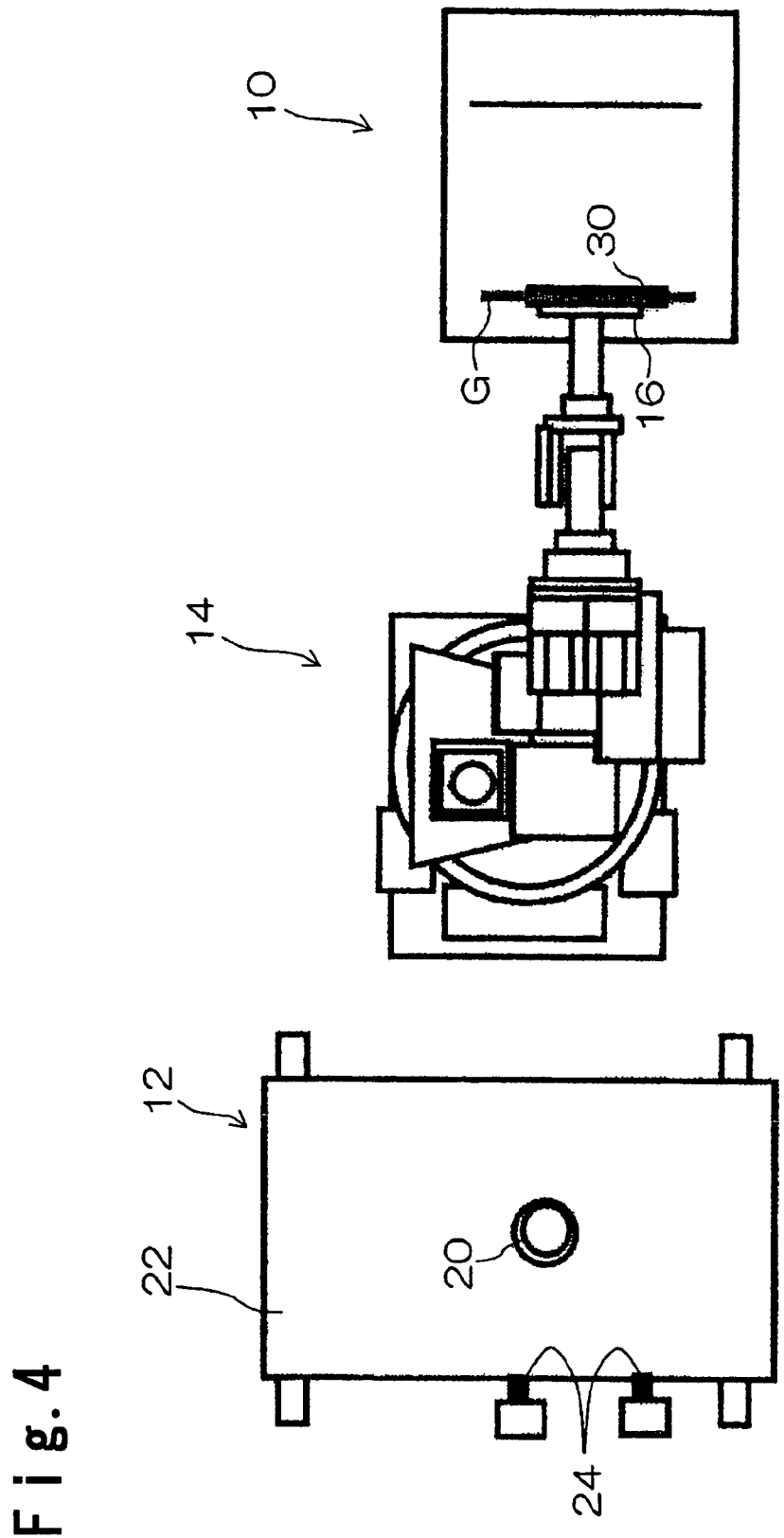
FIG. 4 is a top plan view of the status shown in FIG. 3.
Figure 5:
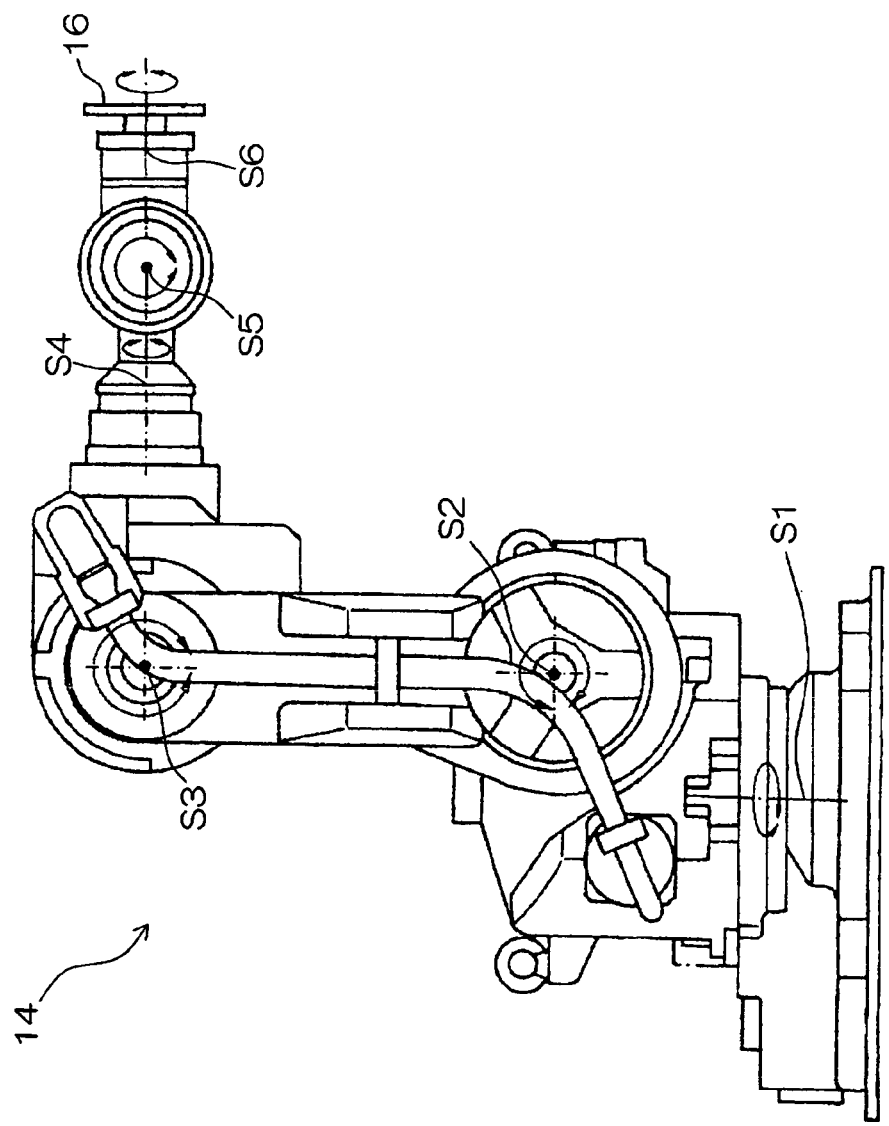
FIG. 5 is a front view of the robot shown in FIG. 1.

FIG. 1 to FIG. 4 show machining equipment for a glass sheet, wherein a single robot 14 is provided between a chamfering machine 10 and a cutting machine 12, and wherein a series of machining processes from scribing and breaking off of a glass sheet G to chamfering of the glass sheet are performed by use of the single robot 14. By an unshown robot controller, the moving trajectories of the robot 14 are controlled so that a robot hand 16 of the robot moves along a moving trajectory required for scribing and breaking off and a moving trajectory required for chamfering. The motion of the robot hand 16 is controlled so as to hold a central position of the scribed and broken off glass sheet G during chamfering by the robot controller. FIG. 1 is a front view showing a status wherein the glass sheet is scored by the robot in the machine equipment. FIG. 2 is a top plan view of the status shown in FIG. 1. FIG. 3 is a front view showing a status wherein the glass sheet is chamfered in the machine equipment. FIG. 4 is a top plan view of the status shown in FIG. 3. FIG. 5 is a front view of the robot shown in FIG. 1. z The cutting machine 12 is configured so as to have a chuck for for scribing and breaking off 24 provided on a table 22 with a suction pad 20. A rectangular glass sheet (original sheet) 1G before scribing and breaking off is conveyed to the table 22 by, e.g., an unshown conveyer. The glass sheet 1G is sucked and held by the suction pad 20 of the table shown in FIG. 1 to be positioned at a certain position on the table 22. The robot hand 16 has a cutter 26 provided thereon to score the glass sheet 1G. The cutter 26 is provided on the robot hand 16 through an unshown inverting mechanism. When scoring the glass sheet 1G, the cutter is directed so as to confront the glass sheet 1G as shown in FIG. 1. When holding the glass sheet 1G or G for scribing and breaking off the glass sheet 1G or chamfering the glass sheet G, the cutter is inverted and withdrawn from a projected position to be housed.

The glass sheet 1G which has been scored by the cutter 26, is held by the robot hand 16, and a peripheral portion of the glass sheet to be scribed and broken off is inserted into the chuck for scribing and breaking off 24. Then, the robot hand 16 is moved in a direction to snap the peripheral portion. The glass sheet G is formed so as to have a final product shape by having the peripheral portions snapped along the scores.

Then, the glass sheet G is conveyed to the chamfering machine 10 by movement of the robot 14, being held on the robot hand 16, as shown in FIG. 3 and FIG. 4.

The robot 14 is a six-axis articulated robot as shown in FIG. 5 and is rotatable about the respective axes S1, S2, S3, S4, S5 and S6. The robot hand 16 is provided with a suction pad, by which the glass sheet G is sucked and held and is conveyed to the chamfering machine 10. The chamfering machine 10 has a rotating grinding wheel 30 (corresponding to the grinding wheel in Claims) as shown in FIG. 3 and FIG. 4. The glass sheet G, which is sucked and held by the robot hand 16, has a peripheral portion pressed against an upper portion of the rotating grinding wheel 30, being at a standing position, as shown in FIGS. 6(a) to (g). By the robot controller, the motion of the robot hand 16 is controlled so that the entire peripheral portion of the glass sheet G is brought into contact with the grinding wheel 30. Thus, the glass sheet G has the entire peripheral portion chamfered. Although the glass sheet G in this embodiment has the entire peripheral portion chamfered, the chamfering machine 10 is applicable to a glass sheet to have a part of the peripheral portion chamfered.

The glass sheet G that has been chamfered is conveyed to a conveyer (not shown), such as a belt conveyer, by the robot 14 and is released from the robot hand 16 of the robot 14 there.

Next, the motion of the robot for chamfering will be explained, referring to FIGS. 6(a) to (g). The chamfering steps shown in FIGS. 6(a) to (c) correspond to the motion for chamfering a linear portion L of the glass sheet G. The chamfering steps shown in FIGS. 6(c) to (g) correspond to the motion for chamfering a corner portion CP of the glass sheet G.

As shown in these figures, while the robot hand 16 rotates the glass sheet G in the clockwise direction in FIGS. 6(a) to (g), the robot hand follows a trajectory A to vertically move along a straight line Q connecting between the center of rotation $0_1$ of the robot hand 16 and the center of rotation $0_2$ of the grinding wheel 30 to chamfer the entire peripheral portion of the glass sheet G.

The motion of a conventional robot hand 1 shown in FIGS. 13(a) to (g) comprises a linear trajectory A and a circular arc trajectory B since the glass sheet G is chamfered, being pressed against a single point P of a grinding wheel 2.

Now, the moving amounts of the robot hands 1 and 16 are compared with each other in the case of using the machine according to the present invention shown in FIGS. 1 to 4 and the conventional machine shown in FIGS. 13(a) to (g). The glass sheets G to be used for comparison were square glass sheets having a side length of 400 mm and a radius of curvature R of 5 mm at each of the corner portions CP. As the grinding wheel 30, a grinding wheel having a radius of 100 mm (8 inches) was used. Although the circular arc trajectory B followed by the conventional robot hand 1 was actually a combination of straight lines, the trajectory B was regarded as being a circular arc since there was no substantially different between a combination of straight lines and a circular arc in terms of calculating the moving amount.

First, the moving amount in the conventional machine will be found, referring to FIG. 7, FIG. 8 and FIGS. 13 (a) to (g).

(1) The moving amount of the robot hand 1 for chamfering the linear portions L of the glass sheet G (see the chamfering steps shown in FIGS. 13(a) to (c))

$$(400-5-5) \times 4 = 1560 \text{ mm}$$

(2) The moving amount of the robot hand 1 for chamfering the corner portions CP of the glass sheet G (see the chamfering steps shown in FIGS. 13(d) to (g))

First, a radius AB is found since the center of the robot hand 1 (=the center of the glass sheet G) is rotated about a point B, having the radius AB as shown in FIG. 8.

Since AB=AC−BC, $AC = 200 \times 2^{1/2}$ and $BC = 5 \times 2^{1/2}$, the equation of $AB = 195 \times 2^{1/2}$ is found.

Thus, the moving amount of the robot hand 1 is found according to the formula of 2 Πr as follows since the robot hand 1 makes one revolution, having the diameter AB, for every glass sheet G:

$$2 \times \Pi \times 195 \times 2^{1/2} \approx 1732.7 \text{ mm}$$

(3) The total moving amount of the robot hand 1 for chamfering the entire glass sheet G ((1)+(2))

$$1560 + 1732.7 = 3292.7 \text{ mm}$$

Next, the moving amount in the machine according to the present invention may be found, referring to FIGS. 6(a) to (g), FIG. 9 and FIG. 10.

(1) The moving amount of the robot hand 16 for chamfering the linear portions L of the glass sheet G (see the chamfering steps shown in FIGS. 6(a) to (c))

Since the moving amount from the chamfering step shown in FIG. 6(a) to that shown in FIG. 6(b) is AB−AC, the following relationships are established:

$$AB = ((200+100)^2 + 195^2)^{1/2} \approx 357.8 \text{ mm}$$

$$AC = 200 + 100 = 300 \text{ mm}$$

Thus, the equation of AB−AC=57.8 mm is found. Since the moving amount from the chamfering steps shown in FIG. 6(a) to FIG. 6(c) is twice that value, the linear moving amount for a side is 115.6 mm. Thus, the following equation is found:

$$115.6 \times 4 = 462.4 \text{ mm}$$

(2) The moving amount of the robot hand 16 for chamfering the corner portions CP of the glass sheet G (see the chamfering steps shown in FIGS. 6(c) to (g))

Since the moving amount from the chamfering steps shown in FIG. 6(c) to FIG. 6(e) is AB−AC, the following relationships are established:

$$AB \approx 357.8 \text{ mm}$$

$$AC = 195 \times 2^{1/2} + 5 + 100 \approx 380.7 \text{ mm}$$

Thus, the equation of AB−AC=22.9 mm is found. Since the moving amount from the chamfering steps shown in FIG. 6(c) to FIG. 6(g) is twice that value, the moving amount at a single corner CP is 45.8 mm. Thus, the following equation is found:

$$45.8 \times 4 = 183.2 \text{ mm}$$

(3) The total moving amount of the robot hand 16 for chamfering the entire glass sheet G ((1)+(2))

$$462.4 + 183.2 = 646.6 \text{ mm}$$

A comparison of both moving amounts reveals that the machine according to the present invention can significantly reduce the moving amount since the moving amount in the conventional machine having a fixed grinding point is 3292.7 mm while the moving amount in the machine having a movable grinding point according to the present invention is 646.6 mm. In particular, a comparison of both moving amounts at the corner portions CP reveals that the moving amount in the machine according to the present invention is reduced to about 1/10 since the moving amount in the conventional machine is 1732.7 mm while the machine according to the present invention is 183.2 mm. As clearly seen from the difference between both moving amounts, it is seen that it is possible to significantly reduce the chamfering time for a glass sheet G in its entirety in accordance with the present invention.

What is noteworthy is the difference between the moving trajectories of both robot hand at the corner portions CP. When an attempt is made to increase the moving speed of the robot hand in order to increase productivity in the conventional machines having a circular arc trajectory, the glass sheet 1G is chamfered so as to have an angular form at a corner portion CP as shown in FIG. 11 since the circular arc forming the moving trajectory comprises a combination of linear trajectories connecting points. Accordingly, the conventional chamfering machines has a disadvantage that chamfering precision is reduced when an attempt is made to increase the moving speed of the robot hand for an increase in productivity.

On the other hand, in accordance with the chamfering equipment of the present invention, it is possible to minimize the moving distance of the robot hand 16 since the moving trajectory of the center of rotation $0_1$ of the robot hand 16 at each of the corners depicts a straight line, not a circular arc. It is also possible to prevent the moving trajectory of the robot hand from being rough even if the moving speed of the robot hand increases. Accordingly, in accordance with the chamfering equipment of the present invention, it is possible to increase chamfering precision since it is possible to chamfer the corners CP in a smooth circular arc-shape as shown in FIG. 12 even if the moving speed of the robot hand increases.

FIG. 14 is a schematic view explaining the optimum position sucked and held by the robot hand when chamfering a peripheral edge portion of an automobile side windshield G having a unique shape.

In this figure, it is shown that the center of gravity $O_3$ of the side windshield G is the optimum position to sucked and held by the robot hand 16. While the side windshield G is held by the robot hand with the center of rotation (holding center) $O_1$ of the robot hand aligned with the center of the gravity $O_3$, the side windshield G has the entire peripheral edge portion chamfered by the grinding wheel 30 in accordance with the chamfering process shown in FIGS. 6(a) to (g). Thus, it is possible to minimize the deviation in the distance between the center of rotation of the robot hand 16 and the contour of the side windshield G. Accordingly, chamfering quality is stabilized since it is possible to decrease a change in the rotational speed of the side windshield G or the moving speed of the robot arm when the chamfering speed at the entire peripheral edge portion of the side windshield G is controlled to be uniform.

When the glass sheet G is pressed against the grinding wheel 30 to be chamfered while the glass sheet is sucked and held by the robot 14 as in this embodiment, the chamfering precision is significantly affected by the backlash of the respective axes of the robot 14 and the flexure of the arm in the sense of mechanics of materials. From this viewpoint, it is important to select the optimum robot posture with the backlash and the flexure minimized, i.e., the optimum robot posture having the highest rigidity in the development of chamfering technique by use of the robot 14.

The six-axis articulated robot 14 in this embodiment includes a first axis S1 as the pivotal axis of a pivotal table, a second axis S2, a third axis S3, a fourth axis S4, a fifth axis S5 and a sixth axis S6 as the rotation axis of the robot hand 16 as shown in FIG. 5.

Now, the results of a comparison test for the rigidity of different postures, which were obtained by providing the different postures to the robot 14, will be shown below. The test was performed in such conditions that the displacement amounts of the robot hand 16 of the robot 14 caused by backlash and the flexing amounts of the robot hand 16 caused by application of a load in each of the different postures were measured by a dial gauge. The total values of the displacement amounts and the flexing amounts in the different postures were evaluated.

In the posture of the robot 14 shown in FIGS. 15(a) and (b), the arm linked with the fifth axis S5 is horizontal and parallel with a plane in parallel with the axes of the arms respectively linked to the second axis S2, the third axis S3 and the fourth axis S4. This posture is called flange level 0°. This is the closest posture to the posture on shipment and is generally used as the reference in many cases. In the case of the posture of flange level 0°, the displacement amounts of the robot hand 16 caused by backlash in Direction No. 1 (vertical direction from upward toward downward), Direction No. 2 (horizontal direction) and Direction No. 3 (vertical direction from downward toward upward) in FIGS. 15(a) and (b) were 0.05 mm for Direction No. 1, 0.25 mm for Direction No. 2 and 0.05 mm for Direction No. 3 as shown in Table 1 of FIG. 16. The flexing amounts caused by application of different loads to the robot hand 16 were a displacement amount of 0.8 mm for application of a load of 490 N in Direction No. 1, a displacement amount of 0.8 mm for application of a load of 372.4 N in Direction No. 2 and a displacement amount of 0.8 mm for application of a load of 401.8 N in Direction No. 3.

On the other hand, in the posture of the robot 14 shown in FIG. 17, the arm linked with the fifth axis S5 is horizontal and perpendicular to the plane in parallel with the axes of the arms respectively linked to the second axis S2, the third axis S3 and the fourth axis S4. This posture is called flange level 90°. In this case, the displacement amounts of the robot hand 16 caused by backlash in Direction No. 1 (vertical direction from upward toward downward) and Direction No. 2 (horizontal direction) were 0.07 mm for Direction No. 1 and 0.04 mm for Direction No. 2 as shown in Table 2 of FIG. 18. With regard to the flexing amounts caused by application of a certain load to the robot hand 16, the flexing amount for application of a load of 490 N in Direction No. 1 was 0.52 mm, and the flexing amount in Direction No. 2 was 0.54 mm.

A comparison of both cases reveals that the posture of flange level 90° was able to suppress the flexing amount of the arm since Direction No. 1 is offset with respect to the axis rotation directions of the second axis S2 and the third axis S3. It was also revealed that the posture of flange level 90° was able to significantly suppress the backlash in comparison with the flange level 0° shown in FIGS. 15(a) and (b) since Direction No. 2 was free from the first axis S1 and was not affected by the first axis S1 having the greatest backlash.

Accordingly, the posture of flange level 90° shown in FIGS. 17(a) and (b), which has the backlash and the flexing amounts minimized, is the optimum robot posture having the highest rigidity. The glass sheet G was chamfered while the robot was maintaining this posture. By this posture, it is possible to increase the chamfering precision. In the case of the posture of flange level 0° shown in FIGS. 15(a) and (b), unless a careful consideration is paid about the moving range of the robot, there is a possibility that the robot 14 is in a singular configuration to cause trouble in movement. In the case of the posture of flange level 90° shown in FIGS. 17(a) and (b), the robot 14 can smoothly move without being in a singular configuration.

The singular configuration of a robot will be explained. The singular configuration of a robot is caused by mathematization of the movement of the robot, which is required to determine how to move articulations of the robot for controlling the robot. When an object on a location is picked up and is carried to anther location by the robot, it is necessary to first find how much respective articulations should be displaced to move a finger tip to the respective locations. On the other hand, it is also necessary to find the location of the finger tip based on the current articulation displacements, to design the trajectory at a later stage or to use the data thus obtained as information. They are generally called kinematics.

A vector r representing the location of a finger tip and the posture of the robot and a vector q representing an articulation displacement are expressed by the following function group wherein f is found in forward kinematics and the reverse function of f is found in inverse kinematics:

$$r = f(q)$$

In the case of a series linkage usually available, it is simple to find the forward kinematics, although it is not simple to find the forward kinematics or impossible to express the inverse kinematics as a mathematical formula.

When the forward kinematics is found by a direct mathematical formula, it is possible to obtain a Jacobian matrix by directly differentiating the mathematical formula.

In the following Jacobian matrix:

$$J_{ij} = \frac{\partial r_i}{\partial q_j}$$

the following equation is established as a relationship between a minimal articulation displacement and a finger tip displacement:

$$\delta r = J(q)\delta q$$

When both sides are divided by a time period δt required for the displacement, and when the limit approaches 0, the following differential form is obtained.

$$\dot{r} = J(q)\dot{q}$$

Thus, a formula to convert an articulate speed into a tip speed. This is usually called the forward kinematics of speed.

If, the Jacobian matrix has an inverse matrix when the robot is in a posture, the following equation is established:

$$\dot{q} = J(q)^{-1}\dot{r}$$

Thus, it is possible to find an articulation speed based on a finger tip speed. In other words, by determining a finger tip speed, it is possible to find an articulation speed for realizing the finger tip speed. This is generally called the inverse kinematics of speed.

The requirement for obtaining the inverse kinematics of speed is that the Jacobian matrix has an inverse matrix. In other words, since one of the conditions that a matrix has a reverse matrix is that the determinant is not 0, the determinant of the Jacobian matrix is not 0 in any cases.

When the determinant of the Jacobian matrix of the robot is found, the determinant contains a term of $\sin(\theta)$. Here, θ is the rotational angle of an articulation of the robot. In this determinant, $\sin(\theta)=0$ can be met in a situation. The equation of $\sin(\theta)=0$ means that the articulation of the robot extends in a straight way (θ=0), and that this term is 0. Since the determinant contains the term related to another articulation, if the term is also 0 (the articulation related to the term extends in a straight way), the determinant is 0. As a result, no inverse kinematics of speed can be established since no reverse matrix can not be found.

The meaning that the determinant is equal to 0 will be considered with respect to an actual robot. When an articulation related for a finger tip extends in a straight way, it is impossible to move the finger tip farther. This is not only applied to the robot but also to a man or woman as can be seen from consideration of a man's or woman's elbow or knee. In the case of a hand or foot, it is possible in some cases to move the position of the hand or foot farther by properly modifying the articulation of the wrist or ankle. However, the posture is also changed. Conversely, when an attempt is made to withdraw the hand or foot, it is necessary to rapidly bend the articulation (it is impossible even to make this motion in the mathematical sense).

Such a situation is called a singularity. The posture that a robot has is called a singular configuration.

It is impossible to make a motion in a specific direction at a singularity. When a robot is close to a singular configuration, it is necessary to extremely quickly move an articulation in order to make a minimal movement. For comparison to a man or women, it is assumed that he or she brings his or her wrist closer to the shoulder by about 1 cm from a state with his or her extending the elbow. He or she knows that the angle of the elbow articulation rapidly increases. On the other hand, when he or she brings his or her wrist closer to the shoulder with his or her elbow significantly bent, the elbow articulation little moves. From this viewpoint, when a robot is set to a task, it is necessary to restrict the moving range of the robot in order to prevent the robot from being brought into a singular configuration.

For these reasons, by chamfering with the posture of flange level 90° shown in FIGS. 17(*a*) and (*b*) (wherein at least the term related to the articulation at the fifth axis S5 in the determinant of the Jacobian matrix is not 0), it is possible not only to increase rigidity but also to avoid a singularity.

The entire disclosure of Japanese Patent Application No. 2003-182260 filed on Jun. 26, 2003 including specification, claims, drawings and summary is incorporated herein by reference in its entirety.

What is claimed is:

1. A method for chamfering a plate-like member, which comprises chamfering a peripheral edge portion of a plate-like member with a robot hand being moved and rotated while using the robot hand to hold the plate-like member and press the peripheral edge against a rotating grinding wheel of a chamfering machine;
    comprising chamfering the peripheral edge with the robot hand being moved and rotated so that a grinding point, at which an edge of the plate-like member and a peripheral surface of the grinding wheel contact, moves along the peripheral surface of the grinding wheel,
    wherein chamfering of the peripheral edge is performed with the robot hand being moved and rotated so that a center of rotation of the plate-like member, moves only along a straight line connecting between the center of rotation of the robot hand and a center of the grinding wheels,
    wherein the robot hand is rotatably provided on a sixth axis of a six-axis articulated robot;
    the articulated robot has the first axis as a pivotal axis, the second and third axes as horizontal axes perpendicular to the first axis, the fourth axis perpendicular to the third axis, the fifth axis perpendicular to the fourth axis and the six axis perpendicular to the fifth axis; and
    the edge portion of the plate-like member is chamfered while the robot is in such a posture that an arm linked to the fifth axis is horizontal and perpendicular to a plane parallel with axes of arms respectively linked to the second axis, the third axis and the fourth axis.

2. The method according to claim 1, wherein a cutting machine for an original plate-like member is provided close to the robot having the robot hand;
    the robot hand holds the original plate-like member and conveys the original plate-like member to the cutting machine, and scribes and breaks off the original plate-like member so as to have a desired shape at the cutting machine; and
    the robot hand coveys the plate-like member thus scribed and broken off to the chamfering machine, and the plate-like member is chamfered by the grinding wheel of the chamfering machine.

3. The method according to claim 1, wherein a cutting machine for an original plate-like member is provided close to the robot having the robot hand;
    the robot hand holds the original plate-like member and conveys the original plate-like member to the cutting machine, and scribes and breaks off the original plate-like member so as to have a desired shape at the cutting machine; and
    the robot hand coveys the plate-like member thus scribed and broken off to the chamfering machine, and the plate-like member is chamfered by the grinding wheel of the chamfering machine.

* * * * *